Sept. 8, 1970

C. C. HARDMAN 3,527,613

METHOD OF LOADING IRON-SULFUR ACTIVE MATERIAL
INTO POROUS METALLIC PLAQUES

Filed Jan. 6, 1969

WITNESSES
Theodore F. Wrobel
Daniel P. Cillo

INVENTOR
Carl C. Hardman,
BY
ATTORNEY 3,527,613
METHOD OF LOADING IRON-SULFUR ACTIVE
MATERIAL INTO POROUS METALLIC PLAQUES
Carl C. Hardman, Pittsburgh, Pa., assignor to Westinghouse Electric Corporation, Pittsburgh, Pa., a corporation of Pennsylvania
Filed Jan. 6, 1969, Ser. No. 789,139
Int. Cl. H01m 43/04
U.S. Cl. 136—25                                    11 Claims

ABSTRACT OF THE DISCLOSURE

A method of loading iron-sulfur active material into porous, bonded, nickel fiber plaques comprises: first, depositing a sulfide residue in the plaque pores; second, making the plaque cathodic by charging it with between 0.1 and 0.8 amp/sq. in. of flat, planar, plaque surface area; third, causing the plaque to be immersed in $$Fe(NH_4)(SO_4)_2 \cdot 12H_2O$$

acid salt solution and electro-precipitating iron-sulfur active material in the plaque pores; removing the plaque from the salt solution after a desired, predetermined amount of active material, having at least 3 weight percent sulfur based on the weight of iron, has precipitated and placing the plaque in KOH forming solution; finally, charging and discharging the plaque to condition it.

BACKGROUND OF THE INVENTION

This invention relates to an improved method of loading iron-sulfur active battery material into porous metallic plaques. These loaded plaques can then be used in electric cells and batteries.

Heretofore, sulfur or sulfur bearing materials have been added to iron active battery materials in rather minute amounts. Application Ser. No. 709,345, now abandoned, filed on Feb. 29, 1968 and assigned to the assignee of this invention by Langer and Patton, teaches the advantages of adding sulfur in larger quantities. Langer and Patton disclose the preparation of active battery material by the addition of a hydroxide-sulfide solution to an iron salt solution. The sulfur material is an additive which prevents passivation of the iron during discharge and creates favorable conditions for an effective acceptance of charge. In the absence of sulfur, there is very low utilization of the iron. A small amount of sulfur material apparently promotes a greater degree of disorder in the crystal structure and thereby enhances diffusion and electrical conductivity of the active material. It also influences the hydrogen overvoltage during charging and the uptake of hydrogen by the iron. The sulfur additive apparently catalyzes the reduction to metallic iron by inhibiting the formation of hydrogen molecules. If an additive is not present, nearly all of the electrical energy is transformed into hydrogen molecule formation.

Iron-sulfur active battery materials have generally been applied to porous metallic plaques either by precipitation within the plaque or pasting pre-prepared active material onto the plaque structure. These porous plaques are generally made of nickel.

Coprecipitation of the iron-sulfur active material free from the plaque and then application to the plaque by pasting methods, does not give the required high utilization of the active material. Impregnating the nickel plaque with an acidic solution of an iron salt, and then dipping it into a caustic solution of hydroxide-sulfide, such as KOH and $K_2S$, to cause the coprecipitation of iron-sulfur active material, also creates problems. In this method, the alternate dips in acid salt and caustic, destroy the natural protective oxide on the nickel and heavy plaque corrosion results. Attempts to pretreat the iron salt solution with a soluble sulfide have not been effective. All of the iron salts that are suitable because of solubility and economy are acid salts, which react with the sulfide to evolve gaseous $H_2S$, which eliminates much of the sulfur from the system.

SUMMARY OF THE INVENTION

Accordingly, it is an object of this invention to provide an improved method of impregnating iron-sulfur active battery material into porous nickel plaques, solving problems of plaque corrosion and loss of sulfur additive.

It is a further object of this invention to provide superior electrode plates for use in electric cells and batteries.

Briefly, my invention accomplishes the foregoing objects by first building up an active sulfur residue within a porous plaque. Secondly, making the plaque cathodic. Next, introducing a soluble acid iron salt and electro-precipitating iron-sulfur active battery material within the plaque pores. These steps basically constitute my improvement. The plaques are then charged and discharged a number of times, washed, dried and weighed. What results is a superior iron-sulfur electrode plate.

BRIEF DESCRIPTION OF THE DRAWINGS

For a better understanding of the nature and objects of the invention, reference may be made to the drawings, in which.

PREFERRED EMBODIMENTS OF THE INVENTION

Figure 1:
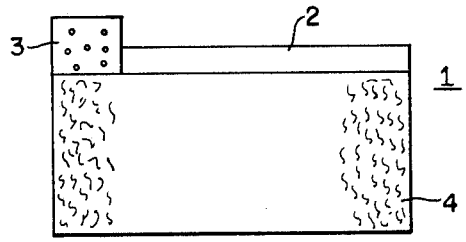
FIG. 1 shows an unloaded, bonded, nickel fiber electrode plaque.

FIG. 1 shows a porous, bonded, metallic fiber plaque 1. 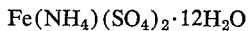 The structure has one edge 2 coined to a high density (about 90 percent). This coined area provides a base to which two strips 3 of metal, for example pure nickel, are spot welded. These welded strips become electrical lead tabs for the loaded plaques.

Preferred plaques for use with my method can be made through careful processing of a flexible, bonded, nickel fiber skeleton, such as that disclosed by Troy, U.S. Pat. 3,127,668, or made by other means such as that disclosed in copending application Ser. No. 764,527, filed on Oct. 2, 1968, and assigned to the assignee of this invention. As shown in FIG. 1, these preferred plaques contain nickel fibers 4 which are bonded together at points along their length. The preferred plaques have fiber diameters between .0002 and .003 inch and a plaque porosity between 75 and 90 percent, i.e., plaque densities between 10 and 25 percent of theoretical density.

Figure 2:
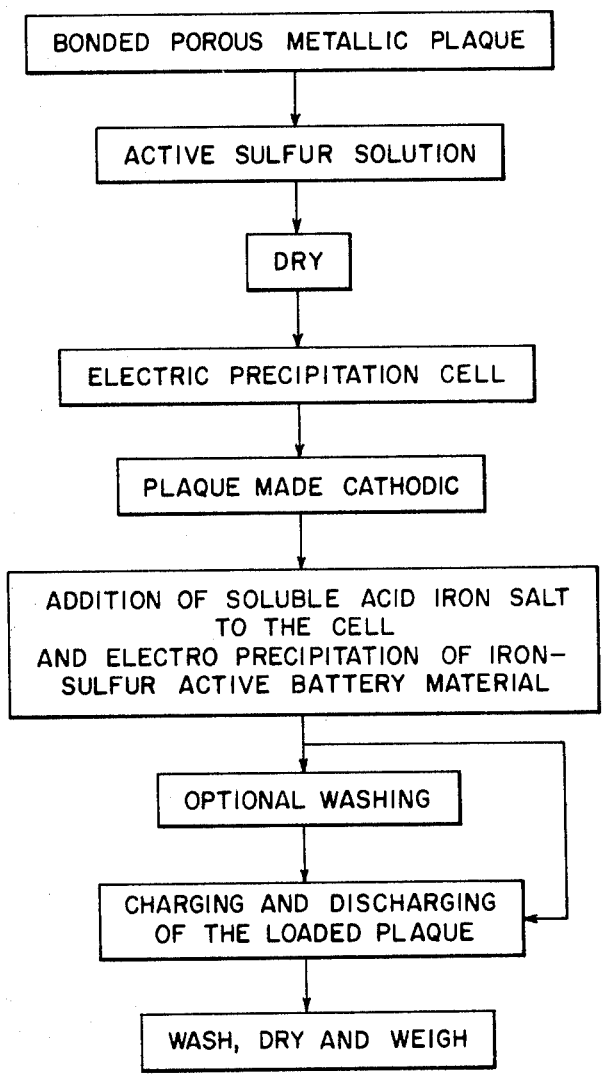
FIG. 2 shows a flow chart of the method of loading active battery material encompassed by this invention.

FIG. 2 shows the improved method of this invention wherein active sulfur in the form of pure sulfur or a sulfide is deposited within the plaque as a first step. In the preferred method of doing this, flexible, bonded, nickel fiber plaques having densities between 10 and 25 percent of theoretical density are dipped in an aqueous solution (about 0.2 to 5 normal) of soluble sulfide, as for example, $Na_2S$, NaHS, KHS or $K_2S$. The plaques are then removed and slowly dried so that the sulfide residue stays within the pores of the plaque. This easily controllable evaporation step can be repeated, if necessary, until the desired predetermined build-up of sulfide within the plaque is obtained. A less desirable means of introducing active sulfur is dipping the plaque into a solution of S dissolved in $CS_2$ and then evaporating the very inflammable $CS_2$. This build-up of active sulfur residue should be such that the final iron-sulfur active battery material contains at least 3 weight percent sulfur based on the weight of iron. The preferred range is from 5 to 25 weight percent sulfur based on the weight of iron.

Next, the plaque containing the sulfide is placed in an electric precipitation cell, wherein the plaque is made cathodic (negative potential) and the iron container of the cell is made the anode. An inert or iron electrode could also be used as the anode. It is critical that the D.C. power supply be turned on, with the nickel plaque negative, or cathodic, before iron salt is added to the cell. Then, a soluble, acid iron salt, such as for example hydrated ferrous ammonium nitrate, hydrated ferric ammonium nitrate, hydrated ferrous acetate, hydrated ferrous nitrate, hydrated ferric nitrate, hydrated ferrous ammonium sulfate or hydrated ferric ammonium sulfate is added to the container so as to immerse the plaque.

The highly soluble ferric ammonium sulfate

$$(Fe(NH_4)(SO_4)_2 \cdot 12H_2O)$$

is preferred. This salt gives a high concentration of iron. The acid salt should have a sp. gravity range from about 1.1 to 1.4 giving a pH of about 1.0 to 0.4. Cathodic electro-precipitation, using current from a D.C. power supply at about 0.5 amp/sq. in. of flat planar plaque surface area, for about 60 to 120 minutes will result in a heavy deposit of iron compound sulfur active material (believed to be FeS, S, and $Fe(OH)_3$ or $Fe_2O_3 \cdot H_2O$) within the plaque. The current density used to make the plaque cathodic is critical and during electro-precipitation must be high enough so that $OH^-$ ions resulting from the cathodic evolution of $H_2$, will raise the pH of the acid salt solution within the plaque (while it is permeating the porous plaque) high enough so that the iron-sulfur active material precipitates. It must be within the range between 0.1 amp/sq. in. and 0.8 amp/sq. in. A current density below 0.1 amp/sq. in. will permit resulting $OH^-$ ions to diffuse away before a pH builds up that causes the precipitation to occur. A current density above 0.8 amp/sq. in. can cause blow-out of the deposit of iron-sulfur active material because of excessive $H_2$ evolution. During electro-precipitation at the cathode (nickel plaque containing $K_2S$), $H_2S$ begins to evolve upon addition of $Fe(NH_4)(SO_4)_2 \cdot 12H_2O$ to the bath due to reaction with $K_2S$. At the same time the breakdown of $H_2O$ at the cathode causes $H_2$ gas to be evolved leaving excess $OH^-$ ions. These ions cause the iron salt solution within the pores of the plaque to become basic (pH of about 8). The rising $H_2S$ will then react under these basic conditions with the iron salt which immerses the plaque to form a precipitate of paste consistency containing it is believed compounds such as $FeS+S+Fe(OH)_3$ or $Fe_2O_3 \cdot H_2O$. Outside the plaque, the iron salt remains acid (pH of about 0.8). If the power supply is not on (plaque cathodic) before addition of electrolyte (iron salt) then the acid iron salt will cause some, or the entire loss of sulfide before the pH of the iron salt within the plaque becomes precipitating enough to trap essentially sulfur in the $Fe(OH)_3$ deposit.

The resulting precipitate is somewhat colloidal at this stage, so that washing in KOH solution to remove impurities, as for example, $K(NH_4)(SO_4)$, is optional. Next, the loaded plaque is placed into a NaOH or KOH solution forming bath in which it is again made cathodic by use of a D.C. power source. The anode is a nickel electrode. The loaded plaque is electrically reduced (charged by a D.C. power supply) at a current density ranging from 0.01 to 0.2 amp/sq. in. of flat planar placque surface area for about 10 to 20 hours, long enough to give nominally twice the required coulombs, i.e., charge efficiency is approximately 50 percent and double the capacity in amp hrs. must be applied. At this time the precipitate becomes metallic iron coating the nickel fibers of the plaque, with interdispersed sulfur in a ratio of about 15 weight percent sulfur based on the weight of iron. Generally, after charging, the plaque will be discharged (made an anode by reversing the polarity to the D.C. power supply) at a current density ranging from about .04 to .3 amp/sq. in. A voltmeter is connected in parallel and discharge continues until the voltage changes rapidly and reaches a limiting voltage of about 1.6 volts. This indicates that the active material in the plaque is all oxidized (i.e., discharged) and the power supply is now oxidizing the electrolyte (i.e., evolving oxygen). Usually 10 charge discharge cycles are run to condition the active material. The resulting deposit of iron-sulfur active battery material can be characterized as mossy but porous. This gives a large internal surface area that permits a high rate of utilization of the active material. The plaque is then washed in deionized water, dried and weighed.

Such an improved method of sulfur addition, necessary for good battery performance, solves prior problems of plaque corrosion and loss of sulfur through evolution of gaseous $H_2S$. These loaded plaques can be used as the negative plate in numerous battery combinations, as for example one plate of a nickel-iron battery.

EXAMPLE

Sintered, nickel fiber structures having fibers .00046 to .00117 inch in diameter and about ⅛ inch in length were used in this example. The plaque density was 15 percent of theoretical density, i.e., 85 percent porous. The plaque size was 3″ x 4″ x 0.03″ thick and the plaque weighed 8.83 grams. One edge was coined and nickel lead tabs were attached by welding. The plaque was dipped in 1 molar $K_2S$ solution prepared by dissolving solid $K_2S$ in water (110 grams of $K_2S$/liter). It was found best to prepare this solution fresh. After dipping the plaque, it was dried at 70° C. in a forced air oven for 1 hour. This evaporating step must proceed slowly in order to keep the active sulfur residue in the pores. The step resulted in $K_2S$ deposits weighing .40 gram.

The plaque was then placed into an electro-precipitation cell. The container was made of iron. Electro-precipitation iron salt solution was a 1.36 sp. gravity solution of ferric ammonium sulfate

$$(Fe(NH_4)(SO_4)_2 \cdot 12H_2O)$$

Electro-precipitation was carried out at room temperature at 5 amperes current (0.415 amp/sq. in.) for 90 minutes. The anode was the iron container cell and the porous nickel plaque was the cathode. A D.C. power supply was used to make the plaque cathodic before the iron salt was added and it is critical that it be on and ready to supply current immediately so that the circuit is closed by the addition of the iron salt solution.

The loaded plaque was then removed from the electro-precipitation cell and rinsed in 25 percent by weight room temperature KOH solution. The plaque was then electrically reduced in another 25 percent by weight KOH forming solution at a current of 0.2 ampere (0.0167 amp/sq. in.) for 16 hours. In this step the loaded porous nickel fiber plaque was the cathode and another nickel electrode was the anode. Current was supplied by a D.C. power supply. Next, a voltmeter was connected in parallel and the loaded plaque was discharged (made anode by reversing the polarity of the power supply) at a current of 0.50 amp (0.04 amp/sq. in.) until the voltage reading went to failing voltage (1.6 volts). Then the plaque was washed in deionized water for 30 minutes and weighed.

Testing began by setting up a half cell with a nickel counter-electrode and 25 weight percent KOH electrolyte. The loaded iron-sulfur active plaque was driven to discharge with a constant current D.C. power supply until a voltmeter connected in parallel read 1.6 volts.

The same power supply was used to charge the cell by reversing the current and making the iron-sulfur loaded plaque cathodic.

Test results on charge-discharge cycles 3 to 10 are tabulated below:

| Cycle No. | Charging conditions | | Discharging conditions | | |
|---|---|---|---|---|---|
| | Current (amps) | Time (hrs.) | Current (amps) | Current density (ma./cm.²) | Capacity (amp-hrs.) |
| 3 | 0.2 | 18 | 0.50 | 6.4 | 1.21 |
| 4 | 0.5 | 18 | 0.50 | 6.4 | 1.45 |
| 5 | 2.0 | 2 | 0.50 | 6.4 | 1.38 |
| 6 | 2.0 | 2 | 1.95 | 25.0 | 1.24 |
| 7 | 2.0 | 2 | 3.90 | 50.0 | 1.15 |
| 8 | 2.0 | 2 | 0.50 | 6.4 | 1.57 |
| 9 | 2.0 | 2 | 7.80 | 100.0 | 0.91 |
| 10 | 2.0 | 2 | 0.50 | 6.4 | 1.49 |

After testing, the plate was washed, dried and weighed. It was ascertained that 1.49 grams of iron and .14 gram of sulfur was present in the plaque giving 9.4 weight percent sulfur based on the weight of iron. Visual inspection of the nickel plaque showed no corrosion. The percent utilization of the active material was found to be about 82%.

I claim:

1. A method of loading active battery material into porous, metallic plaques comprising the steps: depositing a sulfur residue within the plaque; making the plaque cathodic and then immersing the plaque in a soluble iron salt solution to precipitate an iron compound within the plaque to produce an iron compound-sulfur active material within the plaque; removing the plaque from the soluble salt solution after a desired predetermined amount of iron compound-sulfur active material has been produced and placing the plaque in a basic forming solution; and last, charging the plaque by making it a cathode and discharging the plaque by making it an anode.

2. The method of claim 1 wherein the plaques are bonded, nickel fiber plaques having plaque densities between 10 and 25 percent of the theoretical density.

3. The method of claim 2 wherein the sulfur residue is selected from the group consisting of sulfide and sulfur.

4. The method of claim 2 wherein the sulfur residue is deposited by evaporating a soluble sulfide solution contained in the plaque.

5. The method of claim 2 wherein the plaque is made cathodic in the second step by charging it with between 0.1 and 0.8 amp/sq. in. of plaque surface area.

6. The method of claim 2 wherein the soluble iron salt solution is acidic.

7. The method of claim 2 wherein the basic forming solution is selected from the group consisting of NaOH and KOH.

8. The method of claim 5 wherein the active battery material contains at least 3 weight percent sulfur based on the weight of iron.

9. A method of loading active battery material into flexible metallic fiber plaques having plaque densities between 10 and 25 percent of the theoretical density, comprising the steps: depositing a sulfur residue within the plaque; making the plaque cathodic and electrically charging it with between 0.1 and 0.8 amp/sq. in. of plaque surface area and then immersing the plaque with a soluble, hydrated acidic iron salt solution to precipitate an iron compound within the charged plaque and to produce within the plaque an iron compound-sulfur active material containing FeS, S and a material selected from the group consisting of $Fe_2O_3 \cdot H_2O$, $Fe(OH)_3$ and mixtures thereof, removing the plaque from the soluble salt solution after a desired predetermined amount of iron compound-sulfur active material has been produced and placing the plaque in a basic forming solution; and electrically charging the plaque by making it a cathode and electrically discharging the plaque by making it an anode to produce an active battery material containing from 5 to 25 weight percent sulfur based on the weight of iron.

10. The method of claim 9 wherein the sulfur residue is deposited from a soluble sulfide solution in the plaque and said soluble iron salt solution contains an iron salt selected from the group consisting of hydrated ferrous ammonium nitrate, hydrated ferric ammonium nitrate, hydrated ferrous acetate, hydrated ferrous nitrate, hydrated ferric nitrate, hydrated ferrous ammonium sulfate and hydrated ferric ammonium sulfate.

11. The method of claim 9 where, in the last step, the plaque is electrically charged with between 0.01 and 0.2 amp/sq. in. of plaque surface area and electrically discharged with between 0.04 and 0.3 amp/sq. in. of plaque surface area and the iron salt solution is $$Fe(NH_4)(SO_4)_2 \cdot 12H_2O$$

References Cited

UNITED STATES PATENTS

| 1,761,740 | 6/1930 | Nordlander | 106—70 |
| 2,588,170 | 3/1952 | Smith | 136—25.3 |
| 2,737,541 | 3/1956 | Coolidge | 136—25 |
| 2,871,281 | 1/1959 | Moulton et al. | 136—25 |
| 3,066,178 | 11/1962 | Winkler | 136—25 |
| 3,184,338 | 5/1965 | Mueller | 136—76 |
| 3,345,212 | 10/1967 | Schweitzer | 136—25 |

FOREIGN PATENTS 3,711  9/1907  Great Britain.

WINSTON A. DOUGLAS, Primary Examiner

C. F. LE FEVOUR, Assistant Examiner

U.S. Cl. X.R.

136—76; 204—48, 56